March 15, 1955  J. D. ALTEMUS  2,703,953
PEANUT HARVESTING AND SEPARATING MACHINE
Filed April 30, 1952  5 Sheets-Sheet 2

INVENTOR.
JAMES DOBSON ALTEMUS
BY
HIS ATTORNEYS.

March 15, 1955 J. D. ALTEMUS 2,703,953
PEANUT HARVESTING AND SEPARATING MACHINE
Filed April 30, 1952 5 Sheets-Sheet 3

INVENTOR.
JAMES DOBSON ALTEMUS
BY
HIS ATTORNEYS.

March 15, 1955  J. D. ALTEMUS  2,703,953
PEANUT HARVESTING AND SEPARATING MACHINE
Filed April 30, 1952  5 Sheets-Sheet 4
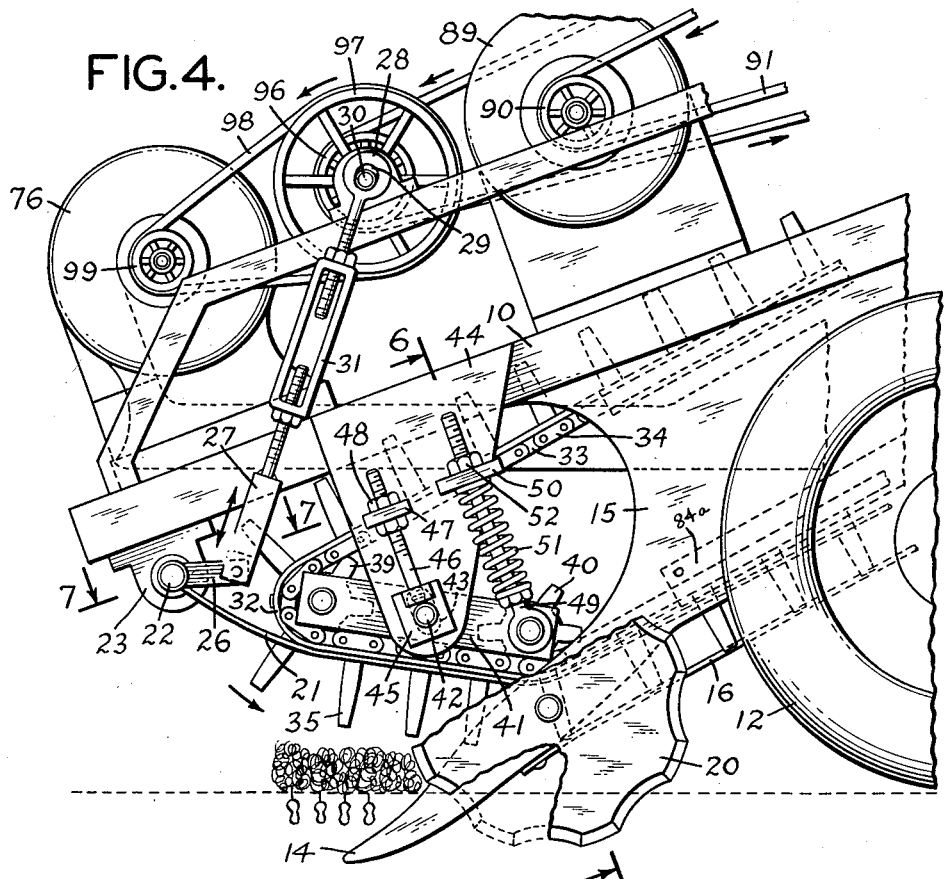
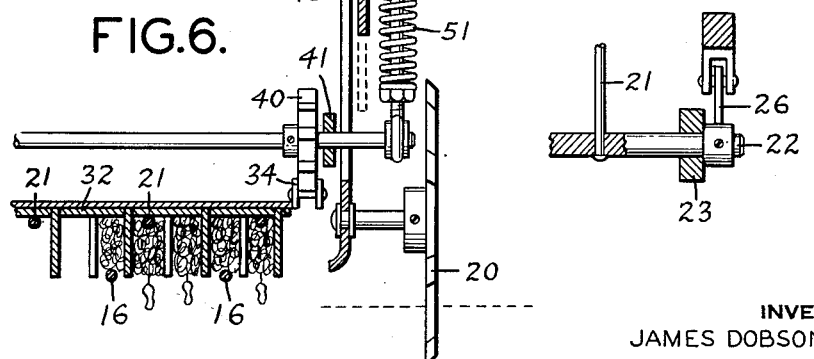
INVENTOR.
JAMES DOBSON ALTEMUS
BY
HIS ATTORNEYS.

March 15, 1955

J. D. ALTEMUS 2,703,953

PEANUT HARVESTING AND SEPARATING MACHINE

Filed April 30, 1952

INVENTOR.
JAMES DOBSON ALTEMUS
BY
HIS ATTORNEYS.

United States Patent Office 2,703,953
Patented Mar. 15, 1955

2,703,953

PEANUT HARVESTING AND SEPARATING MACHINE

James Dobson Altemus, New York, N. Y.

Application April 30, 1952, Serial No. 285,136

8 Claims. (Cl. 55—138)

The present invention relates to machines for harvesting root crops, such as peanuts, potatoes, and the like, and embodies an improved form of harvesting machine by means of which the nuts or other root appendages may be removed from the root structure of the vines and harvested economically and cleanly in a single continuous operation.

Existing machines for harvesting peanuts require the vines to be plowed up, windrowed, and aged upon the ground in order that the nuts may be easily detached therefrom. In these operations many of the nuts are lost, and a great amount of vine trash is accumulated with the nuts.

In accordance with this invention harvesting operations of the above nature are substantially improved, and it is an object of the invention to provide a harvesting machine of the above character whereby the nuts may be harvested as soon as they are matured and while the nuts are still adhering strongly to the vine, thus minimizing the risk of loss of nuts occasioned by existing harvesting methods which require a drying-out period prior to actual picking. Unlike other harvesters, this machine will operate under all types of vine and ground conditions, providing the nuts are still adhering to the vines, and has harvested peanuts during a rainstorm.

Another object of the invention is to provide, in a machine of the above character, means by which the soil may be removed effectively from the nuts, and the nuts separated from the vine and suitably collected.

Further objects of the invention will be apparent as it is described in greater detail in connection with the accompanying drawings, wherein:

Figure 4 is an enlarged partial view of the front lefthand end of the device as shown in Figure 1 with parts broken away and illustrating the manner in which the plow removes the plants from the soil;

Figure 6 is a partial view, in section, taken on the plane indicated by the line 6—6 of Figure 4, and looking in the direction of the arrows;

Figure 7 is a partial view, in section, taken on the plane indicated by the line 7—7 of Figure 4, and looking in the direction of the arrows;

Figure 8 is a partial view, in section, taken on the plane indicated by the line 8—8 of Figure 1, and looking in the direction of the arrows.

Figure 1:
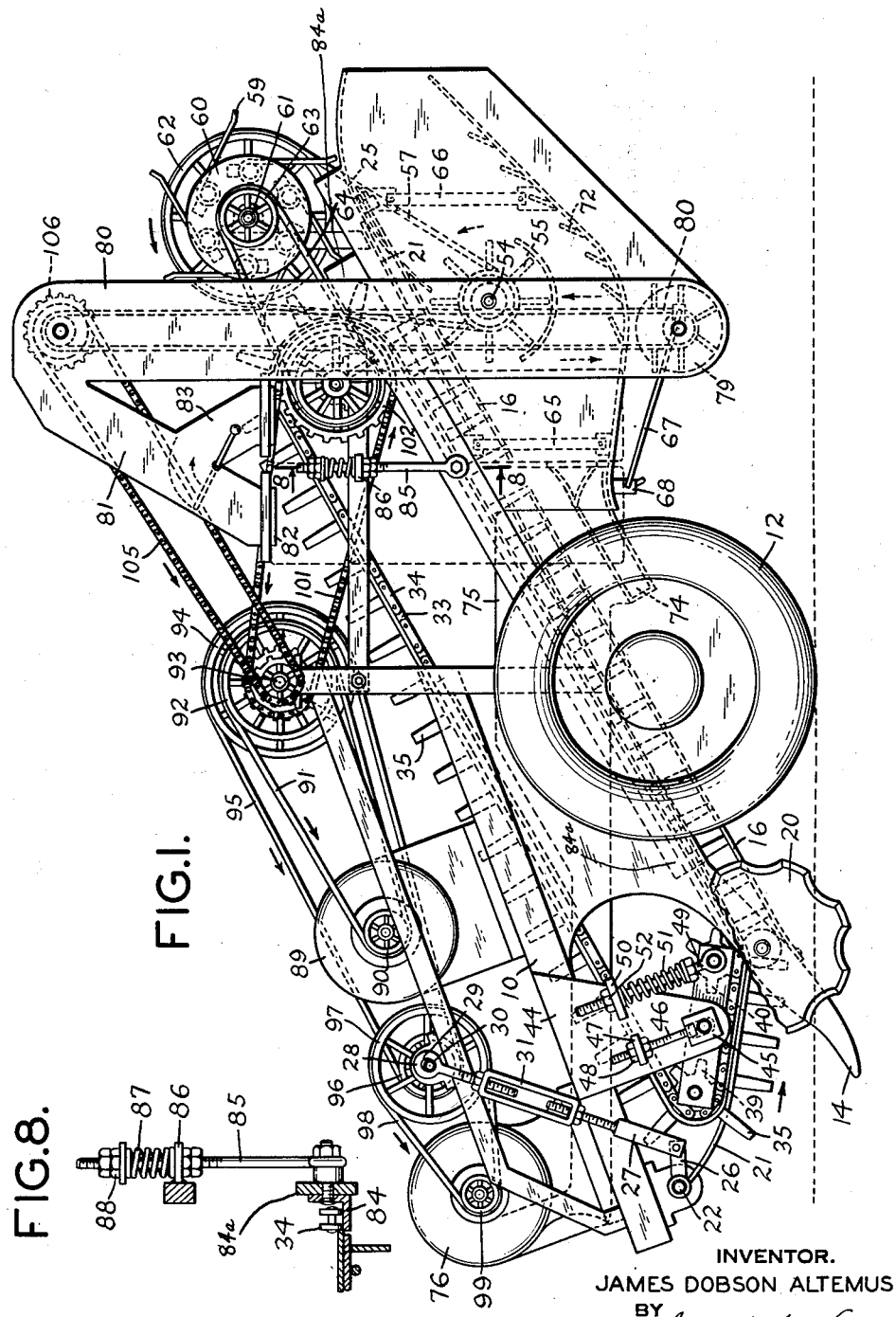
Figure 1 is a view in side elevation of a peanut harvesting machine constructed in accordance with this invention.
Figure 2:
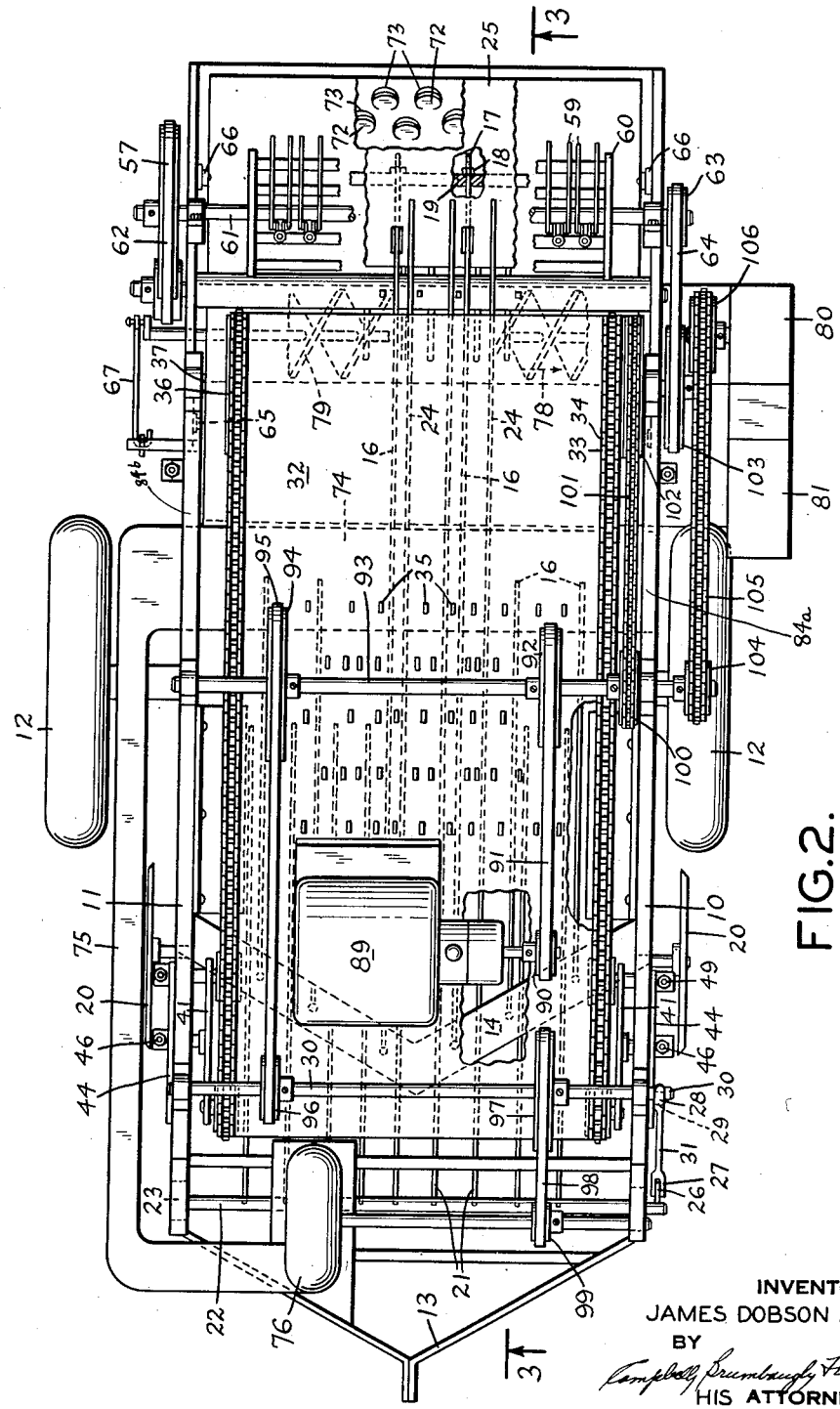
Figure 2 is a plan view of the machine shown in Figure 1.
Figure 3:
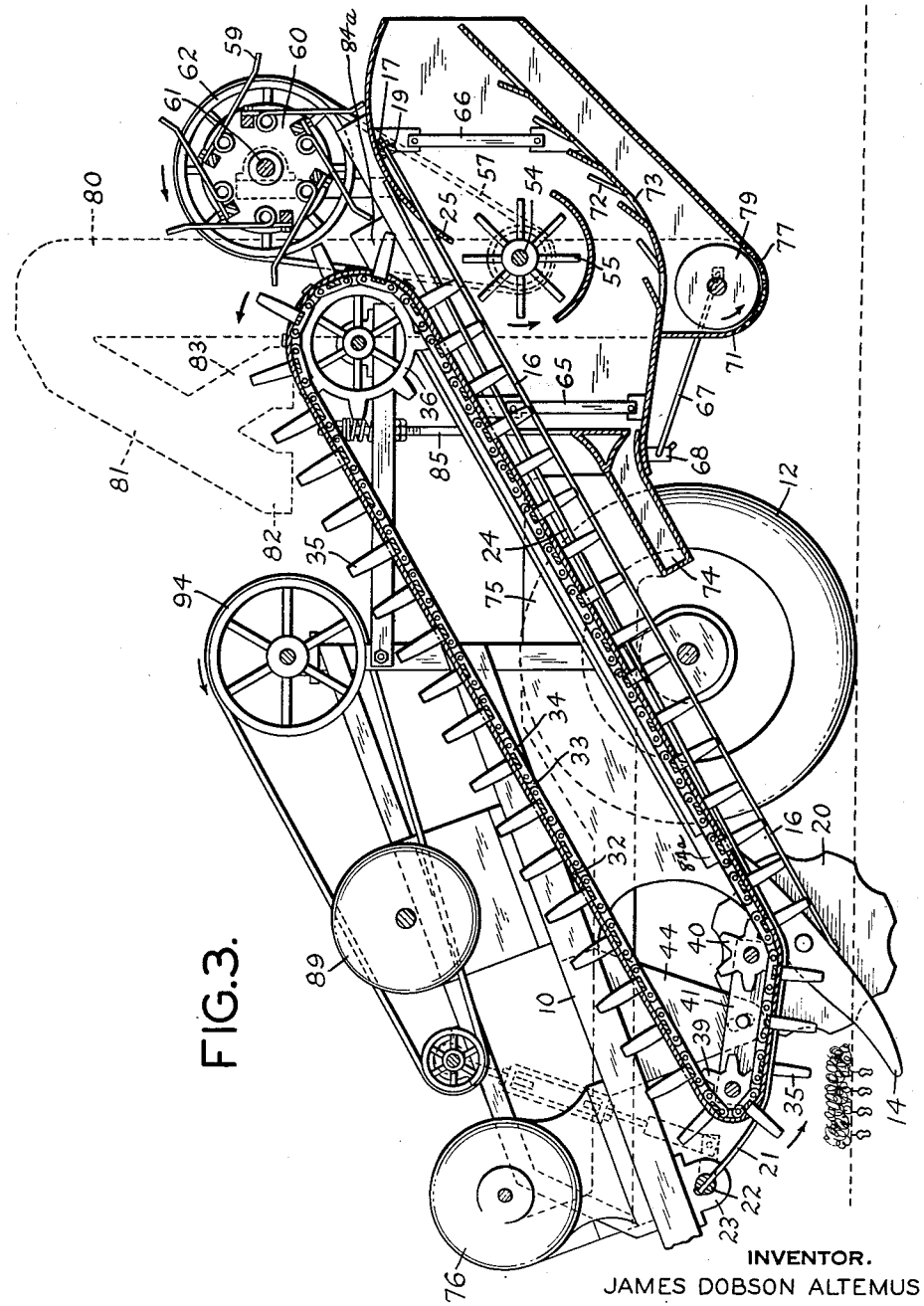
Figure 3 is a view in vertical section, taken on the line 3—3 of Figure 2, and looking in the direction of the arrows.

Referring to the above drawings, particularly to Figures 1, 2, and 3, the device comprises side frame members 10 and 11 upon which supporting wheels 12 are journaled. In the form of the invention shown the wheels are journaled upon shaft members for rotation thereon and are not driven wheels, nor do they furnish power for any of the elements of the mechanism. If desired, of course, these wheels could furnish power for any or all of the mechanism hereinafter described. A suitable draw bar connection 13 is connected to the forward end of the frame members 10 and 11 in order that the harvester may be drawn by any suitable tractor mechanism.

The power take-off from this tractor could also be used to drive the harvester mechanism, in place of the motor as shown.

In order that the peanut vines, together with the roots thereof, may be removed from the soil, a V-shaped plow 14 is secured upon the frame members 11 and 12 by means of side plates 15, the plow comprising a relatively narrow V-shaped share element, as illustrated in Figure 2, to which there are secured a plurality of rearwardly extending and spaced apart supporting rods 16, these rods terminating in threaded rearward extremities 17, and receiving nuts 18 for securing them to a transverse frame member 19.  As will be seen from Figure 3, the plow is so positioned with respect to the ground that, in the operative position of the machine, it extends beneath the lowermost root of the vine so that, as the device is advanced along one or more rows, the plow loosens the soil and causes the vines, together with the soil clinging thereto, to be advanced against and over the supporting rods 16.  Disc cutters 20 are provided at the opposite extremities of the plow in order to define the area of the vine and soil that is disturbed by a single passing of the machine.

Cooperating with the support rods 16 is a plurality of beater bars 21 which are secured to a rock shaft 22 journaled in supporting brackets 23 carried by the respective frame members 10 and 11.  These bars 21 extend rearwardly and downwardly in converging relation with respect to the plow 14 and then upwardly and rearwardly to form beater extensions 24 that converge with respect to the supporting bars 16 eventually lying in a generally superimposed position with respect to a vine guide plate 25.  A crank arm 26 is secured to one end of the shaft 22 and is pivotally connected to a link 27, the other end of which carries an eccentric cam follower 28 that is mounted over an eccentric cam 29 formed upon a rotatable shaft 30.  A turn-buckle or other suitable structure 31 is carried by the link 27 in order that the position of the beater bars 24 with respect to the guide bars 16 may be adjusted as desired, and also in order that the extent of agitation of these members may be suitably adjusted.

Figure 5:
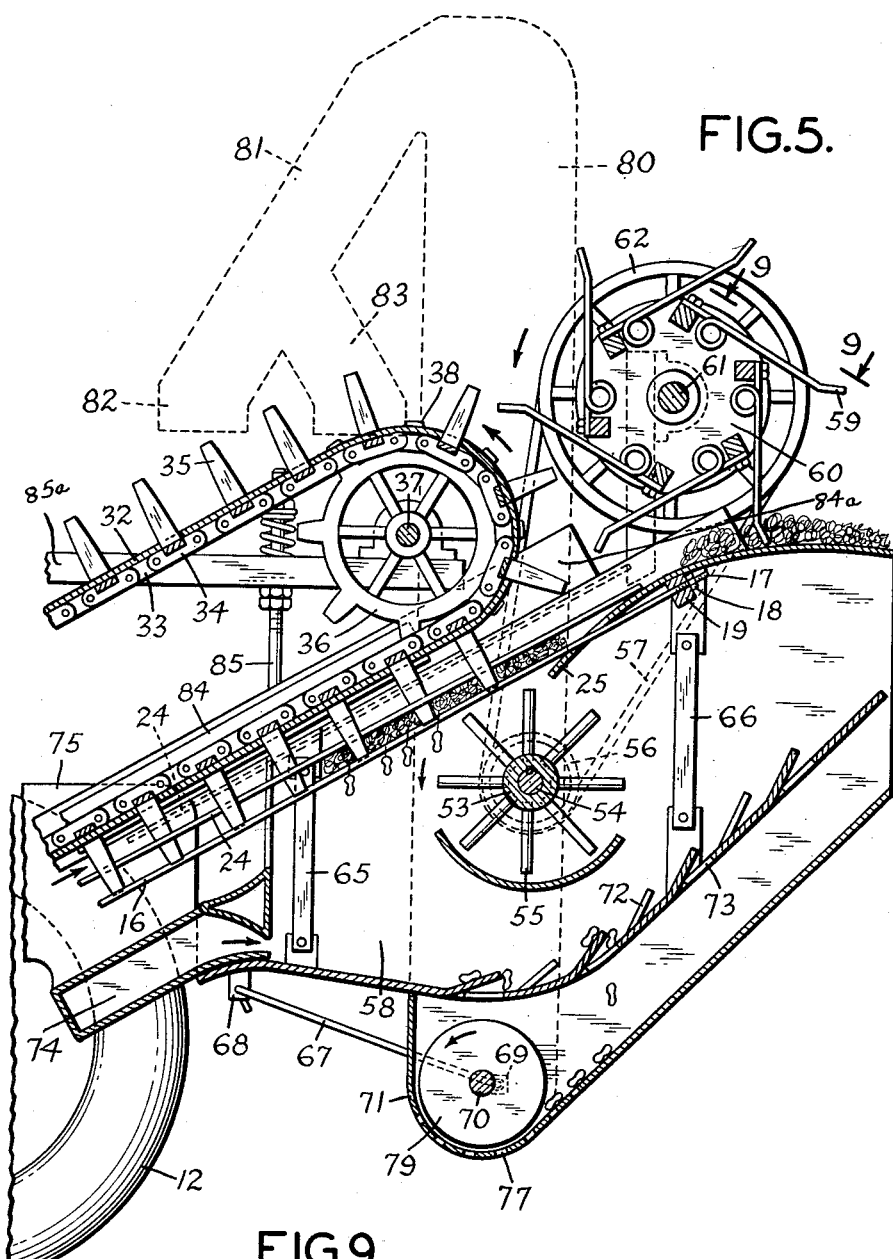
Figure 5 is a view similar to Figure 4, showing the rear left side of the machine as viewed in Figure 1.
Figure 9:
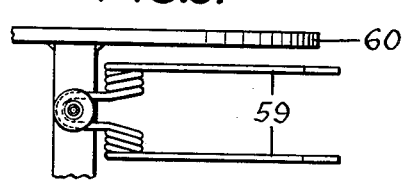
Figure 9 is a detail plan view of the vine ejecting forks of the present invention, this view being taken on the plane indicated by the line 9—9 of Figure 5 and looking in the direction of the arrows.

In order that the vines may be forcefully advanced up the supporting bars 16 an endless belt conveyor 32 is provided upon a link belt, the links of which are illustrated at 33 and 34.  A plurality of fingers 35 are formed upon the links 34, the number of these fingers across the width of the belt being sufficient and their positioning being suitably at random to insure that all of the vines will be engaged and advanced upwardly upon the supporting rods 16, as illustrated, for example, in Figures 3 and 5.

The upper end of the conveyor is supported upon and driven by spaced sprocket wheels 36 journaled upon a drive shaft 37.  The sprockets 38 engage the links 33, 34, and thus drive the conveyor belt in the direction illustrated by the arrows in Figure 3.  The lower end of the conveyor belt is supported upon driven sprockets 39 and 40 at each side of the machine, each of these pairs of sprockets being journaled, respectively, upon rock bars 41 formed with stub shafts 42.  These stub shafts 42 are slidably received within slots 43, formed in supporting brackets 44, carried upon opposite sides of the machine. The position of the stub shafts 42 in the slots 43 is controlled by an adjustable bearing member 45 (Figure 1) which is formed with a threaded shaft 46 that is adjustably secured to a lug 47 formed upon the respective brackets 44 by means of nuts 48.  The position of the rock bar 41 is controlled by means of a link 49 which is journaled to the right-hand end (as viewed in Figure 1) of the rock bar and is slidably received in a lug 50 secured to the respective brackets 44.  Springs 51 and nuts 52 serve to position the link 49 with respect to the fixed lug 50 and yieldingly maintain the rock bar 41 in a desired position.  By means of the foregoing mechanism the desired varying angle and tension are applied to the vine feed-in to permit the intake of larger or smaller clumps of vine and also to yield at the introduction of any heavy foreign matter so that no damage will be caused to the machine; therefore, belt tension is uniform regardless of the position of the rock bars. It will be noted that as the fingers 35 of the belt advance the vines upwardly over the supporting rods 16, the beater rods 24 move up and down over the vines to beat them repeatedly in their upward course. This action is extremely effective in causing the soil to be dislodged from the vines and root crops.

At the upper and rearward portion of the mechanism a drum 53 is mounted upon a rotatable shaft 54, the drum being provided with a plurality of rubber or other resilient fingers 55 and driven by a belt or chain 57. The shaft 54 is suitably journaled with respect to the supporting rods 16 so that, as the vines reach the upper extremity of the supporting rods, the fingers 55 strike the nuts and knock them from the vines and into a hopper that is indicated generally at 58. After the nuts have been removed from the vines, the latter advance rearwardly and upwardly over the end plate 25 where they are engaged by fork-shaped fingers 59 carried upon a cage 60. The cage 60 rotates in a counter-clockwise direction (as viewed in Figure 3) and thus ejects the vines rearwardly and outwardly from the machine. To accomplish this, the cage 60 is secured to a rotatable shaft 61 which is driven by pulley or sprocket 63 (Figure 2) that is engaged and driven by belt or chain 64. At the other end of this shaft is a pulley or sprocket wheel 62 over which belt 57 passes, driving drum and shaft 54 on which flexible fingers 55 are mounted.

The hopper 58 (Figure 5) is supported upon the frame of the machine by means of links 65 and 66 which suspend the hopper beneath the drum 53 in order that it may catch the nuts that fall from the vines. A slight oscillation of the hopper is accomplished by means of a link 67 that is secured to a lug 68 formed at the forward bottom side of the hopper and to an eccentric arm 69 carried at one end of a rotatable shaft 70 which is journaled in the end walls of a housing 71 for a peanut conveyor. The bottom of the hopper 58 is formed with rearwardly and upwardly extending projections 72 that are arranged in staggered relationship, as illustrated in Figure 2. The peanuts fall through the openings 73 formed in the bottom of the hopper beneath the respective projections 72 and thus fall into the conveyor housing 71. In order that soil and dust may be removed from the hopper 58, a discharge manifold 74 is provided at the forward end thereof, this manifold receiving air under pressure from an air duct 75 which receives air from a blower 76 mounted upon the forward end of the harvester. If any dirt falls through the opening 73, it descends into the lower portion of the housing 71 and escapes through apertures 77 formed therein.

From the bottom of the housing 71 the peanuts are removed by advancing them in the direction indicated by the arrow 78 in Figure 2, and by means of a screw conveyor 79. An elevator of conventional design, indicated in dotted line at 80 in Figure 5, lifts the peanuts from the bottom of the housing 71 and delivers them to a discharge chute 81 from which they may be directed by means of a suitable valve to either of two discharge outlets 82 or 83. Bags or other receptacles may be placed beneath these outlets in order that the harvested peanuts may be collected.

As the links 33, 34 of the conveyor 32 move rearwardly and upwardly, they ride upon longitudinal angle bars 84 which are supported by side frame members 84a and 84b, which are secured to the plow cheek 15 and upon which are mounted the bearings for the shaft carrying the wheels 12. These frame members run rearwardly the entire length of the machine. Links 85 are also mounted on these side frame members and position a pivotally mounted frame 85a on which sprocket wheels 36 are mounted. These wheels are held in position by springs 87 which permit them to allow the passage of vine clumps and foreign matter between the belt and rods 16.

In order that the foregoing mechanism may be driven positively, a suitable source of power is illustrated at 89. This power source may be a gasoline engine having a driving pulley 90 for driving a belt or chain 91 that engages a driven sprocket or pulley 92 carried by a countershaft 93. The countershaft is provided with a driving pulley 94 and drives a belt 95 which extends forwardly over a driven pulley 96 secured to the shaft 30. Shaft 30 is also provided with a drive pulley 97 which drives a belt 98 running over a driven pulley 99 for driving the blower 76.

The counter-shaft 93 is also provided with a driving sprocket 100 which drives a chain 101, which runs over a driven sprocket 102 carried by the shaft 37. The shaft 37 also carries a driving pulley 103 over which the belt 64 passes to drive the drum 60.

In order that the conveyor 80 may be driven, the counter-shaft 93 is also provided with a driving sprocket 104 which is provided with a driving chain 105 that drives a driven sprocket 106 carried by the upper conveyor shaft.

While the invention has been described with specific reference to the accompanying drawings, it is not to be limited save as defined in the appended claims.

I claim:

1. A separating mechanism for cooperation with a plow for removing root appendages from vines dug by said plow, comprising a frame, means for supporting the frame in operative position upon the ground, guide rods on said frame inclined upwardly relative to the ground to support vines thereon with the root structure of the vines depending from the rods, conveying means on the frame for moving vines up the guide rods, and means on the frame and movable relative to the conveying means and the guide rods for beating the vines as they move up the rods.

2. A separating mechanism for cooperation with a plow for removing root appendages from vines dug by said plow, comprising a frame, means for supporting the frame in operative position upon the ground, guide rods on said frame and extending upwardly and rearwardly to support vines thereon with the root structure of the vines depending from the rods, conveying means for moving vines up the guide rods, means on the frame movable relative to the guide rods and the conveying means for beating the vines as they move up the rods, and means on the frame for removing root appendages from the root structure of the vines while the latter are supported on the rods.

3. A separating mechanism for cooperation with a plow for removing root appendages from vines dug by said plow, comprising a frame, means for supporting the frame in operative position upon the ground, guide rods on said frame and inclined upwardly relative to the ground to support vines thereon with the root structure of the vines depending from the rods, means on the frame for moving vines up the guide rods, beater means adjacent to and movable toward and away from said vine moving means and said guide rods for engaging and shaking said vines to remove dirt therefrom, and means on the frame for removing root appendages from the root structure of the vines while the latter are supported on the rods.

4. A separating mechanism for cooperation with a plow for removing root appendages from vines dug by said plow, comprising a frame, means for supporting the frame in operative position upon the ground, guide rods on said frame and inclined upwardly relative to the ground to support vines thereon with the root structure of the vines depending from the rods, means adjacent to said guide rods and mounted on said frame for moving vines up the guide rods, means on said frame adjacent the upper ends of said guide rods for removing root appendages from the root structure of the vines while the latter are supported on the rods, a hopper on the frame beneath the last-named means, means in the hopper for directing a blast of air over the collected appendages in the hopper for removing dirt therefrom, and means for agitating the hopper to discharge said appendages from said hopper.

5. A separating mechanism for cooperation with a plow for removing root appendages from vines dug by said plow, comprising a frame, means for supporting the frame in operative position upon the ground, guide rods on said frame and extending upwardly and rearwardly to receive and support vines thereon with the root structure of the vines depending from the rods, an endless conveyor mechanism mounted on said frame above the rods, means on the frame for moving the conveyor with the portion thereof adjacent the rods moving upwardly and rearwardly, projections on the conveyor for engaging vines on the rods, beater rods adjacent to and extending generally parallel to the guide rods and lying between the projections on the conveyor, and means on the frame for vibrating the beater rods relative to said guide rods to clean said vines.

6. The mechanism set forth in claim 5 in which said beater rods are mounted for rocking movement adjacent one end thereof, and the means for vibrating the beater rods comprises a power driven crank connected to said rods.

7. The mechanism set forth in claim 5 comprising a hopper on said frame adjacent to the upper ends of said guide rods, and a rotary beater above said hopper and adjacent to the upper ends of said guide rods, and means on said frame for rotating said beater to remove the root appendages from the vines while they are supported on said guide rods.

8. The mechanism set forth in claim 5 comprising means on said frame for knocking the root appendages from the vines while the latter are supported on said rods, and means on said frame to receive said root appendages.

References Cited in the file of this patent

UNITED STATES PATENTS

| | | |
|---|---|---|
| 1,251,425 | Rogers et al. | Dec. 25, 1917 |
| 2,037,300 | Arbuckle | Apr. 14, 1936 |